Figure 1:
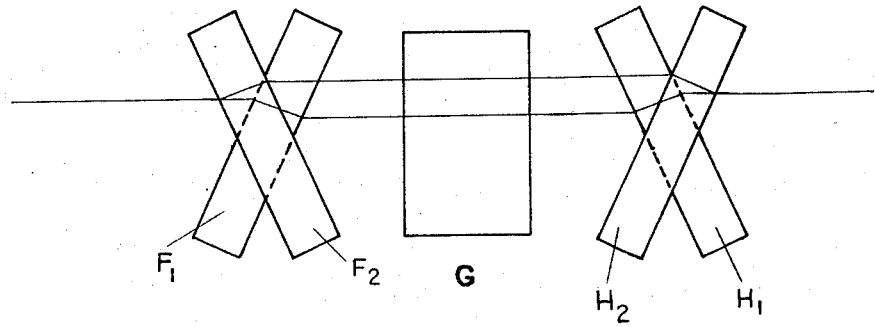

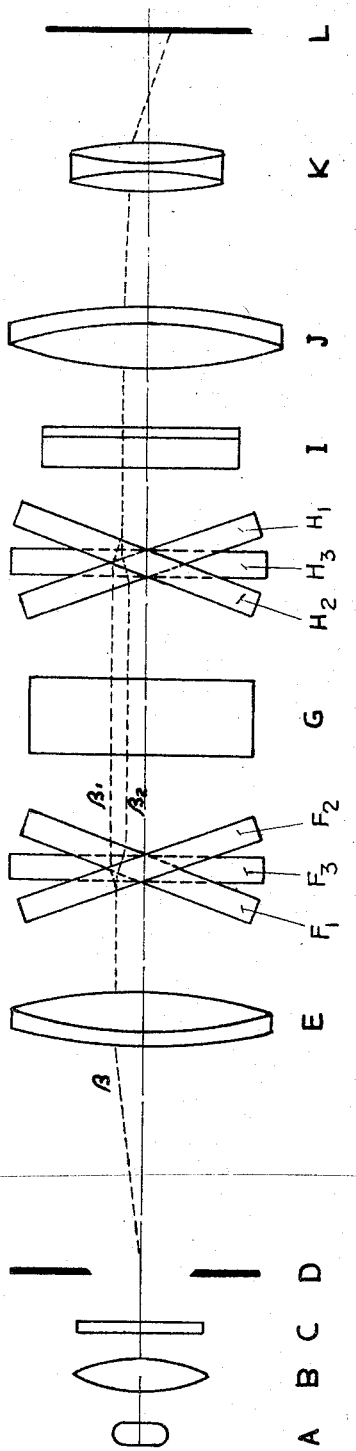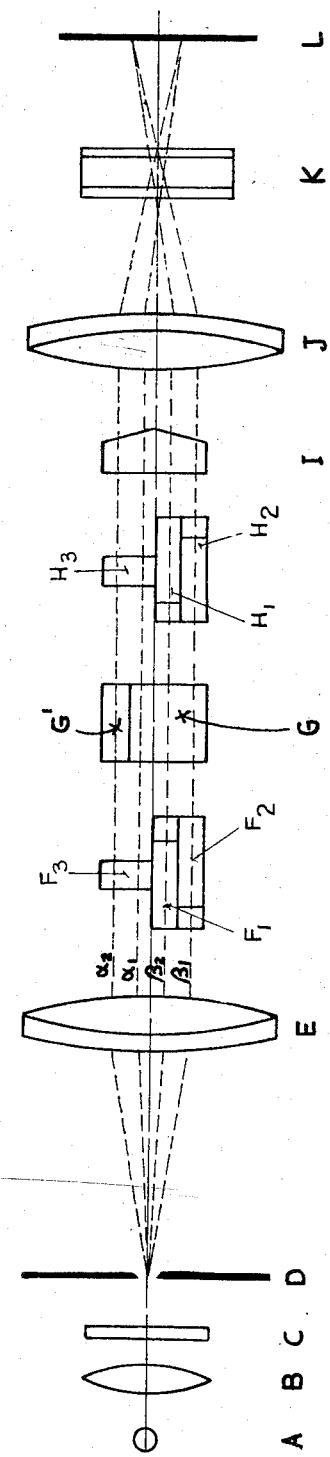

2,821,881

OPTICAL ARRANGEMENT FOR ANALYSIS OF REFRACTIVE INDEX

Svante Harry Svensson, Sundbyberg, Sweden, assignor to LKB-Produkter Fabriksaktiebolag, a Swedish company Application October 18, 1954, Serial No. 462,948

Claims priority, application Sweden February 22, 1951

7 Claims. (Cl. 88—14)

This application is a continuation-in-part of my co-pending application, Serial Number 211,888, filed February 20, 1951, which has matured into U. S. Patent #2,703,033, issued March 1, 1955 and relates to an apparatus for recording the derivative of the optical thickness of an object in which said thickness varies in one direction only. The device can also be used in combination with an arrangement for recording the optical thickness itself, whereby it becomes possible to get combined records of the optical thickness and its derivative by the aid of one and the same instrument. As is customarily known in the art, optical thickness refers to the product of the geometric thickness and the refractive index. The derivative of optical thickness refers to the derivative of optical thickness with respect to a linear distance generally the heighth. The derivative is taken with respect to the coordinate in the direction of which the refractive index varies.

Hitherto known methods for making automatic records of the derivative of the optical thickness of an object are based on Toepler's well-known Schlieren method. The optical foundation of this method is the fact that a light pencil that passes through an optically inhomogeneous medium suffers an angular deflection in the direction of the gradient of the optical thickness and of an amount that is proportional to the numerical value of said gradient. The original Schlieren method is applicable to objects where the gradient may have any direction. For objects in which the gradient has everywhere the same direction (e. g. stratified solutions in a cell), there is one mechanical modification, the Schlieren scanning method, described by Longsworth (J. Am. Chem. Soc. 61, 529, 1939), and one astigmatic modification, devised by Philpot (Nature 141, 283, 1938) and Svensson (Kolloid-Z. 87, 181, 1939; 90, 141, 1940), of Toepler's original arrangement. These modified arrangements allow direct photography of patterns which give the value of the derivative of the optical thickness as a function of the coordinate along its gradient.

The present invention deals with an entirely new arrangement for making records of the derivative of the optical thickness of objects with a gradient of constant direction. It is interferometric in character and consists of an interferometer in which the two coherent pencils pass so closely side by side that both can traverse the object, said interferometer being completed on the entrance side of the object by an optical device for making a relative parallel displacement between the pencils in the direction of the gradient, and on the exit side of the object by a similar device which produces the same relative displacement back again. In the case of autocollimation, i. e. when there is a mirror perpendicular to the direction of the radiation close behind the object and the radiation thus goes back through the object, then the entrance and exit sides of the object are identical, and only one device for parallel displacement is necessary. A relative parallel displacement of a light beam is most easily accomplished by an inclined glass plate placed in the way of one of the coherent beams. This plate will, however, also cause a considerable path difference which would destroy the conditions for interference. It is therefore necessary to use a glass plate of the same thickness in the way of the other light beam. The path difference is also a function of the inclination of the glass plates. Consequently if the device for parallel displacement shall not introduce any unwanted path differences between the coherent light beams, the two plates must also have the same inclination but for the sign. By the aid of such an arrangement, one of the light beams is displaced as much in the direction of the gradient as the other is displaced in the opposite direction, and the only path difference between them is that caused by the object. If the parallel displacement caused by one inclined plate is called $\Delta x/2$, the path difference between the two pencils becomes (as a first approximation):

$$\frac{d(an)}{dx}\Delta x$$

where $a$ is the local effective thickness of the object and $n$ its local refractive index. The sensitivity of the recording is thus proportional to the parallel displacement of the beams, which in turn depends on the inclination of the glass plates. On the other hand, with too large values of $\Delta x$, the first approximation given above is not sufficiently accurate, since higher powers of $\Delta x$ should then also be taken into account. One must consequently make a compromise between the demands of high sensitivity and of the convenience in using the simple expression above.

This device for recording the gradient can also be combined with already known devices for recording the optical thickness itself. The latter device is then the same interferometer, the only difference being that one of the two coherent beams passes through the object, the other one through a reference object, and that no inclined plates are in the way of the beams. However, in order to secure that the object gets the same geometric-optical distance to the lens system that gives optical imagery of it, whether the light passes the inclined plates or not, it is advisable to place a glass plate of the same thickness as the inclined ones, but at right angle to the radiation, in the way of the two beams which give the integral record.

As already mentioned, the interferometers which are suitable for use in conjunction with this invention are those in which the two coherent pencils pass closely side by side parallel to each other. This property is very characteristic of Rayleigh's interferometer, the astigmatic modification of which is capable of recording variable optical thicknesses (for references, see the above-mentioned application No. 211,888). Jamin's interferometer can, however, also be used if the half-silvered beam-splitting plates are not too thick. Michelson's and Mach-Zehnder's interferometers are unsuitable for the present invention, but Koesters' interferometric double prism (see B. I. O. S. Report No. 1659, item No. 9, p. 71) can be used with great advantage.

Figure 2:
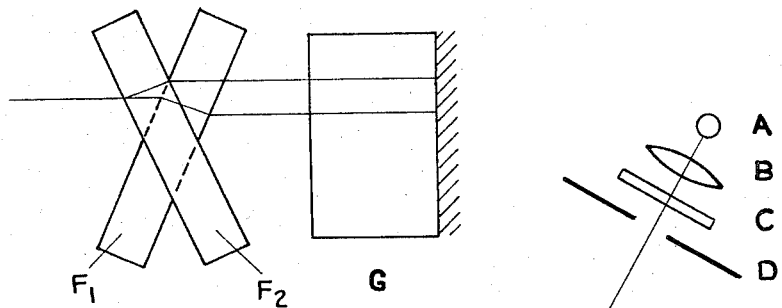
Figure 5:
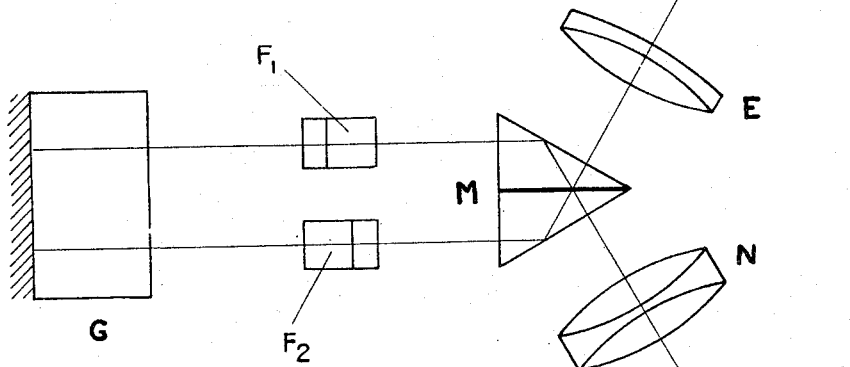

In the accompanying drawings, Fig. 1 shows the principle of the invention for light transmitted through the object once, and Fig. 2 the same for the case that the back wall of the object is reflecting and throwing the light back again the same way. These figures show the object and the plano-parallel plates in a section parallel to the gradient of the optical thickness. Figs. 3–4 show an arrangement for combined recording of the optical thickness and its gradient with the use of an astigmatically modified Rayleigh interferometer, Fig. 3 being a section parallel to the gradient, and Fig. 4 a section perpendicular thereto. In this arrangement, one pair of coherent beams of light, denoted $\alpha_1$ and $\alpha_2$, produce a record of the optical thickness throughout the object, since $\alpha_1$ passes the object G, and $\alpha_2$ the reference object G' with a constant optical thickness, while another pair of coherent beams, denoted $\beta_1$ and $\beta_2$ produce a record of the derivative of the optical thickness, since corresponding $\alpha_1$ and $\alpha_2$ rays both pass the object, but at slightly different levels. The beams $\alpha_1$ and $\alpha_2$ are separated by the wall between the chambers G and G'. The beams $\beta_1$ and $\beta_2$ are separated by the wall between the plates $F_1$ and $F_2$. Fig. 5, finally, shows an arrangement for combined recording, using a Koesters' interferometric beam-splitter. This figure is a section perpendicular to the gradient of the optical thickness.

Corresponding components in the different drawings carry the same notation. Thus A denotes a light source with a line spectrum, B is a condensing lens, C is a light filter that makes the light strictly monochromatic, D is a slit, E is a collimating lens, $F_1$ and $F_2$ are the pair of inclined glass plates on the entrance side of the cell, $F_3$ is a vertical plate of the same thickness, G is the object, G' a reference object, $H_1$ and $H_2$ are the pair of inclined glass plates on the exit side of the object, I is a double prism that prevents the integral and the differential interferograms from superposition on the plate in the case of combined recording, J and K form together an astigmatic lens system with the property of making the light-indicating device L, which may be a photographic plate or the like optically conjugate to the slit D in the section in Fig. 4 and to the middle of the object in Fig. 3. In Fig. 5, as well as in Fig. 2, the object G has a reflecting back wall. M is the beam-splitter according to Koesters and consists of two 30, 60, 90° prisms, the long cathetus side of one prism being coated by a half-transparent metal foil and then sealed to the corresponding surface of the other by means of Canada balsam. N is a spherical lens that gives an optical image of the optical middle section, i. e., the back wall, of the object G on the photographic plate light-indicating device L.

I claim:

1. An interferometric arrangement for recording the gradient of optical thickness of objects in which said gradient has a uniform direction, comprising a light source system producing at least two coherent beams of light which are mutually parallel and which pass through the object at least once, at least two transparent, plano-parallel plates of essentially the same thickness positioned on the entrance side of the object, each of said plates being placed in the path of one of the coherent beams of light and being turned, from an orientation perpendicular to the optic axis, through the same angles in opposite directions about an axis perpendicular to the optic axis and to the direction of the gradient, at least two similar plates on the exit side of the object placed in the same manner and with angles opposite to those of the corresponding plates on the entrance side of the object, a lens system, and a light-indicating device, said lens system causing the plane through the middle of the object, with reference to the path of light, and the light-indicating device to be optically conjugate at least in a section through the optic axis parallel to the gradient in the object.

2. An interferometric arrangement for recording the gradient of optical thickness of objects in which said gradient has a uniform direction, comprising a light source system producing at least two coherent beams of light which are parallel to each other and which pass through the object, at least two transparent plano-parallel plates of essentially the same thickness placed on the entrance side of the object, each plate being placed in the path of one of the coherent beams of light, both plates being turned through essentially the same angle in opposite directions around an axis perpendicular to the optic axis and to the gradient of the optical thickness of the object, at least two similar plates placed on the exit side of the object, each plate being placed in the path of one of the coherent beams of light and being turned as the plates above, a lens system, and a light-indicating device, said lens system causing the plane through the middle of the object and said light-indicating device to be optically conjugate at least in a section through the optic axis parallel to the gradient in the object.

3. An interferometric arrangement as defined in claim 2 in which the light source system includes a beam-splitting device comprising a half-transparent and half-reflecting foil enclosed between and in optical contact with two prisms cemented together so as to become mutual mirror images with respect to said foil, and in which the plane through the optical middle of the cell and the light-indicating device are optically conjugate in both sections through the optic axis.

4. An interferometric arrangement according to claim 2, in which the light source includes a diaphragm having at least one slit parallel to the direction of the gradient of the optical thckness of the object, and in which the light-indicating device is optically conjugate to the light source diaphragm in a section through the optic axis perpendicular to the gradient and to the plane through the middle of the object in a section parallel to said gradient.

5. An interferometric arrangement for recording the gradient of optical thickness of objects in which said gradient has everywhere the same direction, comprising a light source producing at least two coherent beams of light which are parallel to each other and which pass through the object, at least two transparent, plano-parallel plates of essentially the same thickness positioned adjacent the entrance side of the object, each of said plates being positioned in the path of one of the coherent beams of light, both of said plates being turned through essentially the same angle in opposite directions round an axis perpendicular to the optic axis and to the gradient of the optical thickness of the object, a mirror adjacent the object on the other side thereof and arranged so as to reflect the light back again the same way through the object and through the inclined plates, a light-indicating device, and a lens system for causing the plane of said mirror and said light-indcating device to be optically conjugate at least in a section through the optic axis parallel to the direction of the gradent of the optical thickness of the object.

6. An interferometric arrangement for the simultaneous recording of the optical thickness and its gradient of an object in which said gradient has everywhere the same direction, comprising a light source producing two pairs of coherent beams of light which are parallel to each other, a first pair passing through the object, while one beam of the second pair passes through the object and the other beam through a reference object of essentially the same optical thickness comprising further on the entrance side of the object two transparent, plano-parallel plates of essentially the same optical thickness, placed in the way of one of the two coherent beams of the first pair, both plates being turned through essentially the same angle in opposite directions round an axis perpendicular to the optic axis and to the gradient of the optical thickness of the object, on the exit side of the object two similar tilting plates placed in the way of the same two coherent beams of light so as to make each beam to pass two plates of essentially equal, but opposite inclination, comprising finally a light-indicating device and a lens system that makes the plane through the middle of the object and said light-indicating device optically conjugate at least in a section through the optic axis parallel to the direction of the gradient of the optical thickness of the object.

7. An interferometric arrangement according to claim 6, in which the light source includes a diaphragm having at least one slit parallel to the direction of the gradient of the optical thickness of the object, and in which the light-indicating device is optically conjugate to said light source diaphragm in a section through the optic axis perpendicular to the gradient and to the plane through the middle of the object in a section parallel to said gradient, and further including a prism having a refracting edge parallel to the gradient, said prism being so placed on the exit side of the second set of plano-parallel plates as to cause the two pairs of coherent beams to pass on either side of said refracting edge.

References Cited in the file of this patent

UNITED STATES PATENTS

| | | |
|---|---|---|
| 1,561,173 | Kosters | Nov. 10, 1925 |
| 2,518,647 | Teeple et al. | Aug. 15, 1950 |

FOREIGN PATENTS

| | | |
|---|---|---|
| 455,553 | Germany | Feb. 3, 1928 |
| 595,211 | Germany | Apr. 12, 1934 |
| 919,843 | France | Dec. 16, 1946 |
| 269,550 | Switzerland | July 15, 1950 |

UNITED STATES PATENT OFFICE

CERTIFICATE OF CORRECTION

Patent No. 2,821,881 February 4, 1958

Svante Harry Svensson

It is hereby certified that error appears in the above numbered patent requiring correction and that the said Letters Patent should read as corrected below.

In the heading to the printed specification, line 7, for "Claims priority, application Sweden February 22, 1951" read -- Claims priority application Sweden February 22, 1950 --.

Signed and sealed this 29th day of April 1958.

(SEAL)
Attest:

KARL H. AXLINE
Attesting Officer

ROBERT C. WATSON
Commissioner of Patents